United States Patent
Lee

(10) Patent No.: US 11,203,853 B2
(45) Date of Patent: Dec. 21, 2021

(54) CABIN ASSEMBLY FOR CONSTRUCTION EQUIPMENT

(71) Applicant: Doosan Infracore Co., Ltd., Incheon (KR)

(72) Inventor: Sang Kyoo Lee, Incheon (KR)

(73) Assignee: DOOSAN INFRACORE CO., LTD., Incheon (KR)

( * ) Notice: Subject to any disclaimer, the term of this patent is extended or adjusted under 35 U.S.C. 154(b) by 55 days.

(21) Appl. No.: 16/489,514

(22) PCT Filed: Feb. 28, 2018

(86) PCT No.: PCT/KR2018/002472
§ 371 (c)(1),
(2) Date: Aug. 28, 2019

(87) PCT Pub. No.: WO2018/160006
PCT Pub. Date: Sep. 7, 2018

(65) Prior Publication Data
US 2019/0382981 A1    Dec. 19, 2019

(30) Foreign Application Priority Data

Feb. 28, 2017 (KR) .................. 10-2017-0026727

(51) Int. Cl.
*E02F 9/16* (2006.01)
*B62D 33/06* (2006.01)

(52) U.S. Cl.
CPC ............ *E02F 9/16* (2013.01); *B62D 33/0604* (2013.01); *B62D 33/0617* (2013.01); *E02F 9/163* (2013.01)

(58) Field of Classification Search
CPC ....... B60R 21/13; B60R 21/131; B62D 33/06; B62D 33/0604; B62D 33/0617; E02F 9/16; E02F 9/163

(Continued)

(56) References Cited

U.S. PATENT DOCUMENTS 6,810,980 B2 * 11/2004 Jo ........................... B60R 21/11
                                                    180/89.13
7,364,223 B2 *  4/2008 Mori .................. B62D 33/0604
                                                    180/89.13

(Continued)

FOREIGN PATENT DOCUMENTS

JP        H10204924 A     8/1998
JP      WO2008069091 A1   3/2010

(Continued)

OTHER PUBLICATIONS

English translation of JP 2016-151093; retreived on Jan. 15, 2021 via PatentTranslate located at www.epo.org. (Year: 2021).*

(Continued)

*Primary Examiner* — Jason S Daniels
(74) *Attorney, Agent, or Firm* — K&L Gates LLP

(57) ABSTRACT

A cabin assembly for construction equipment includes a main frame; a mount mounted on the main frame; a cabin fixed to the main frame by the mount while spaced a predetermined distance apart therefrom; a retainer for connecting the cabin to the main frame and fixing the cabin to the main frame such that the cabin is not inclined at a first angle or greater with respect to the main frame; and a support installed on one of the main frame and a lower surface of the cabin, including an end portion facing the other of the main frame and the lower surface of the cabin while being spaced apart therefrom, and when the cabin is inclined at a second angle or greater with respect to the main frame, contacting the other of the main frame and the lower surface of the cabin to support the cabin.

5 Claims, 9 Drawing Sheets

(58) Field of Classification Search
USPC .............................. 296/190.08, 190.07, 35.1
See application file for complete search history.

(56) References Cited

U.S. PATENT DOCUMENTS

| | | | | |
|---|---|---|---|---|
| 7,828,371 | B2* | 11/2010 | Murakami | B62D 33/0604 |
| | | | | 296/190.03 |
| 8,517,457 | B2* | 8/2013 | Yamamoto | B62D 33/0604 |
| | | | | 296/190.07 |
| 9,333,992 | B2* | 5/2016 | Kinoshita | B62D 33/0617 |
| 10,099,728 | B2* | 10/2018 | Shinohara | F16F 1/36 |
| 2006/0071499 | A1* | 4/2006 | Yoon | B62D 33/0604 |
| | | | | 296/35.1 |
| 2016/0031494 | A1* | 2/2016 | Kinoshita | E02F 9/0808 |
| | | | | 296/190.07 |
| 2017/0009425 | A1* | 1/2017 | Tajima | E02F 9/166 |

FOREIGN PATENT DOCUMENTS

| | | |
|---|---|---|
| JP | 2011026908 A | 2/2011 |
| JP | 2016151093 A | 8/2016 |
| KR | 20070012994 A | 1/2007 |

OTHER PUBLICATIONS

International Search Report for related International Application No. PCT/KR2018/002472; report dated Sep. 7, 2018; (3 pages).
Written Opinion for related International Application No. PCT/KR2018/002472; report dated Sep. 7, 2018; (5 pages).

* cited by examiner

[Fig.1.]
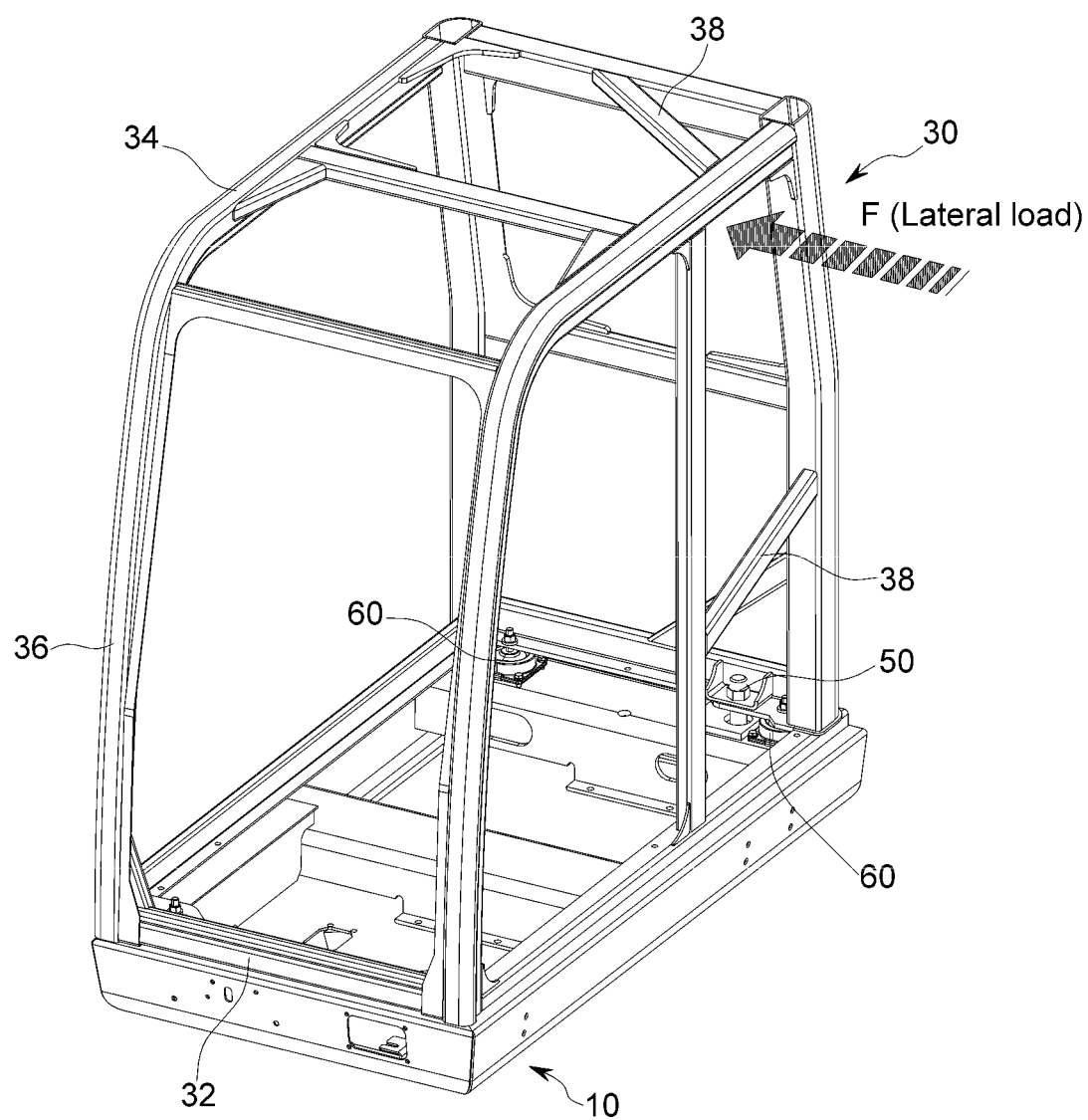

[Fig.2.]
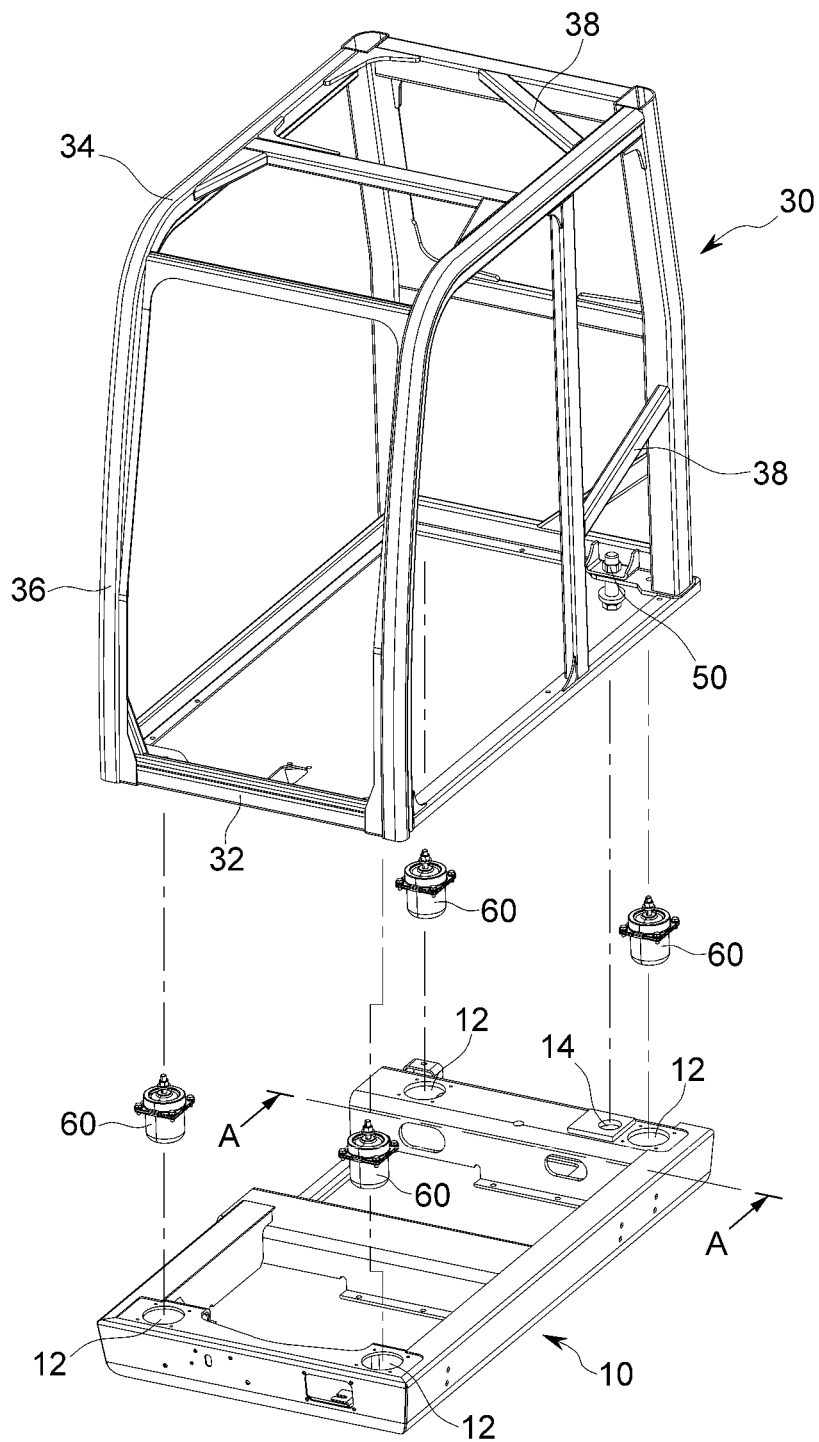

[Fig.3.]
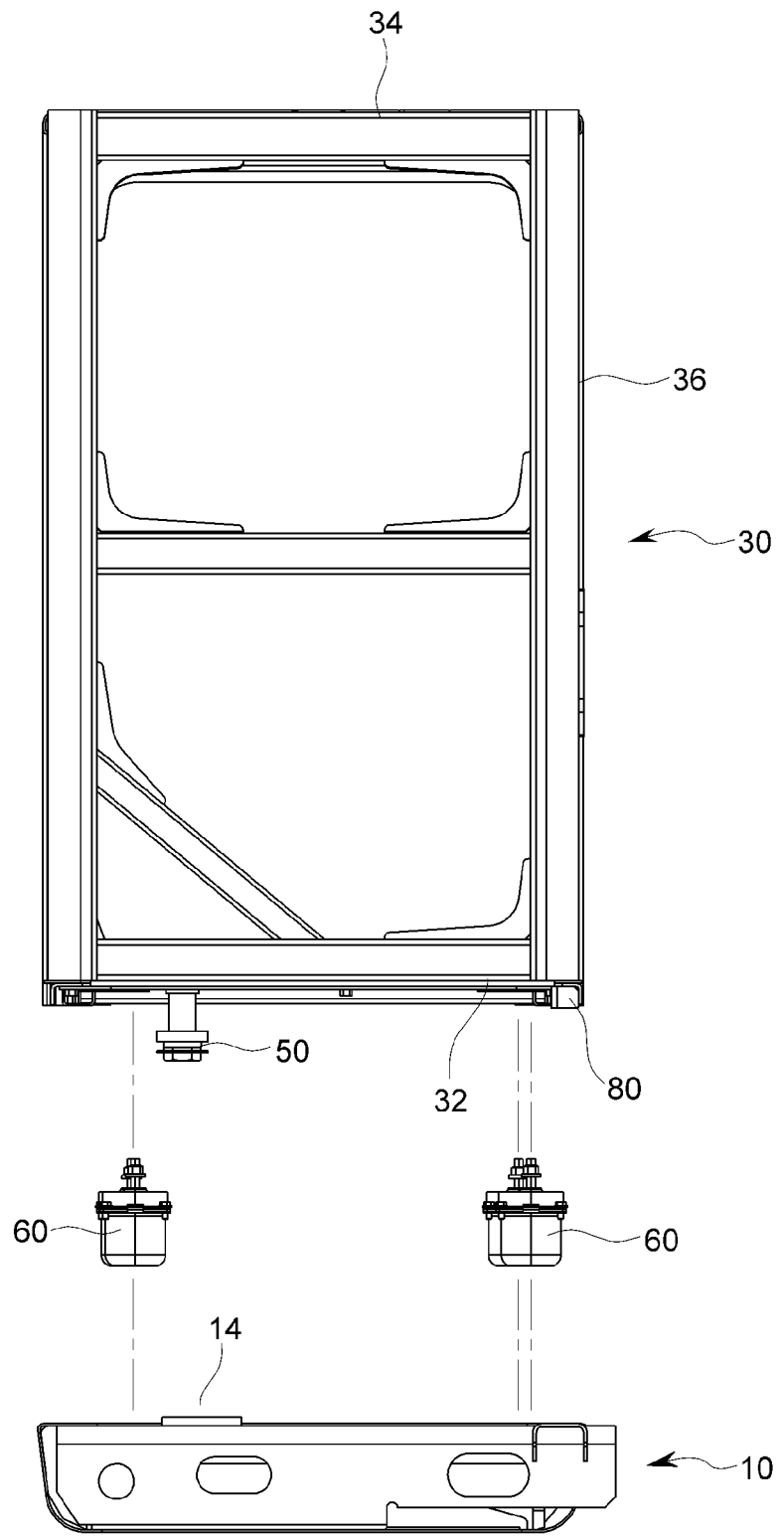

[Fig.4.]
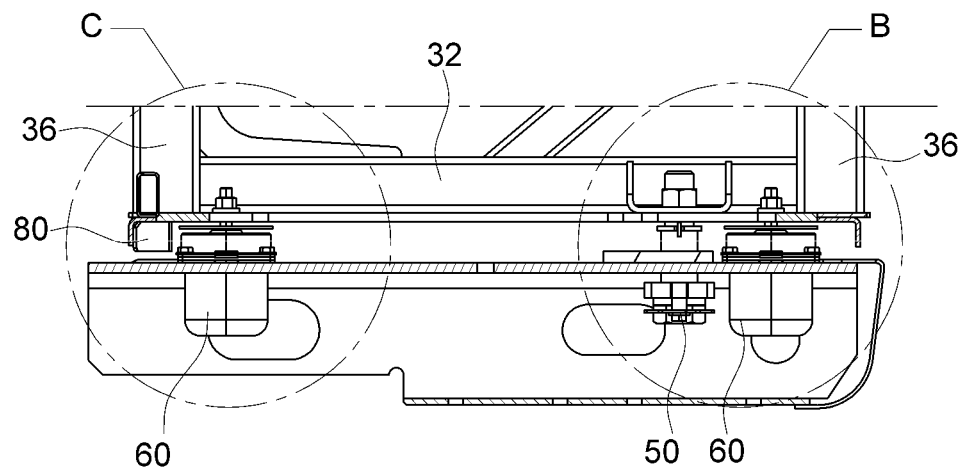

[Fig.5.]
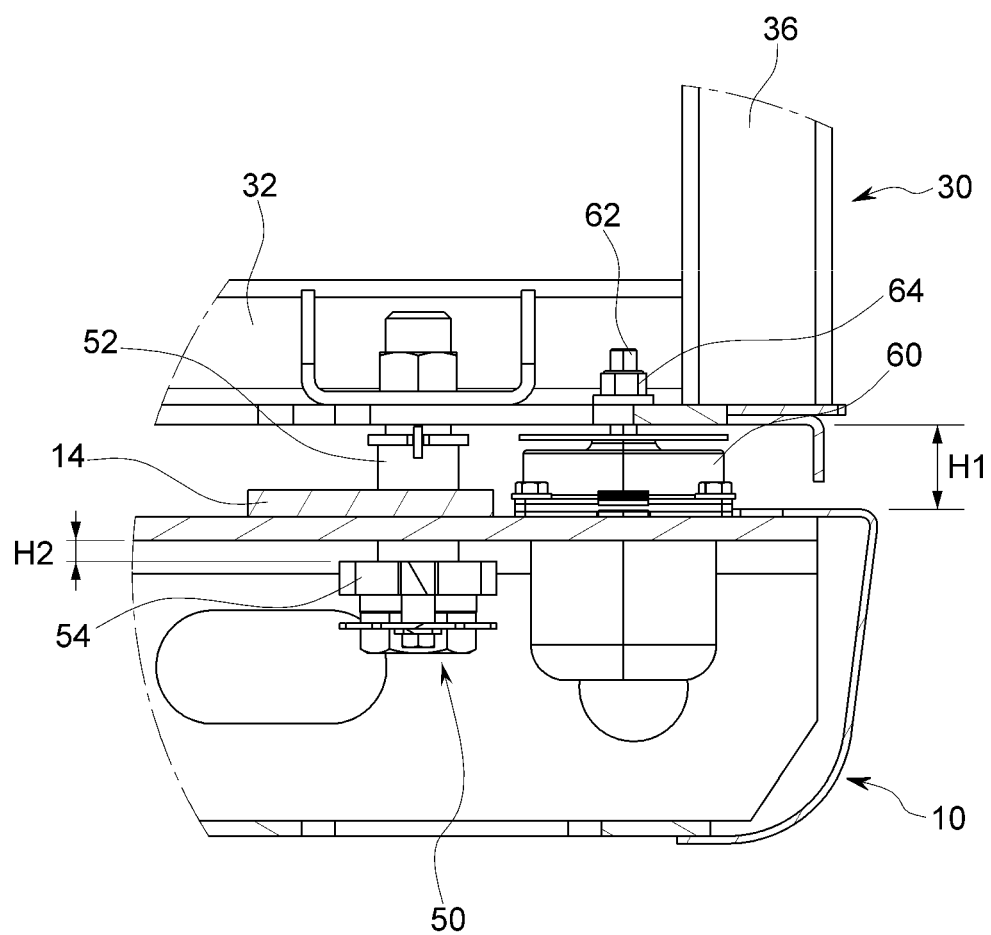

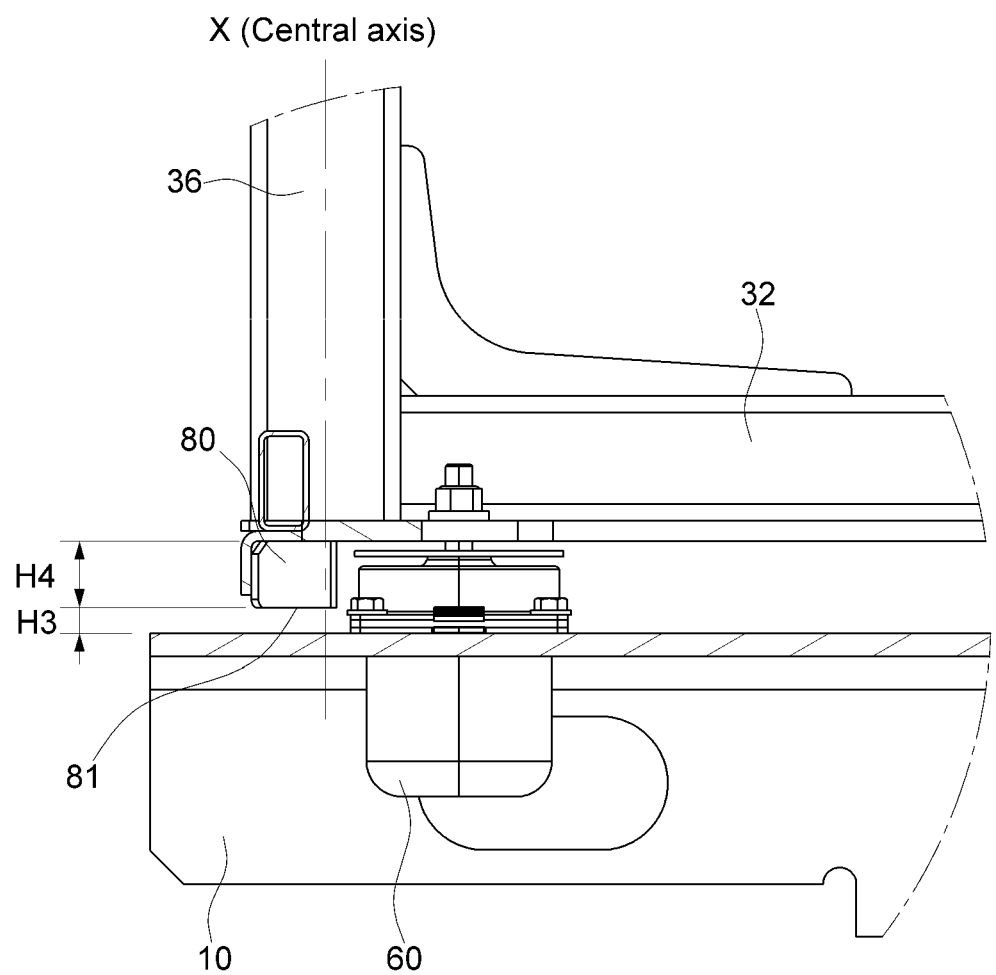
[Fig.6.]

[Fig.7.]
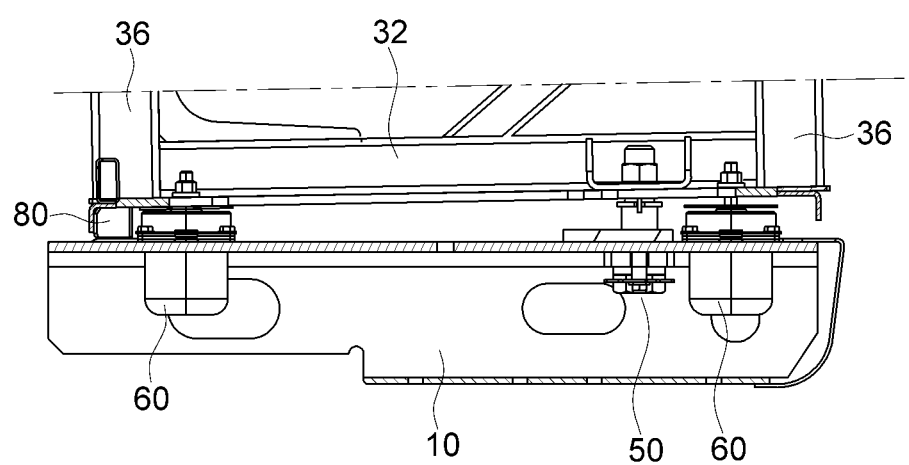

[Fig.8.]
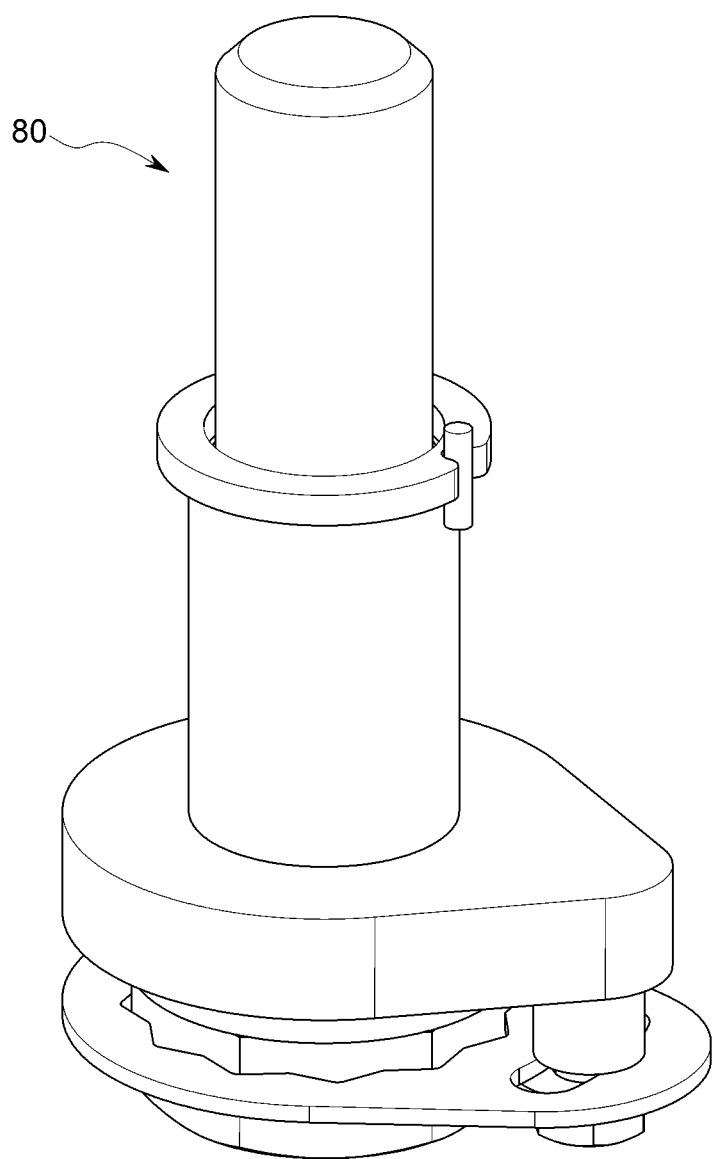

[Fig.9.]
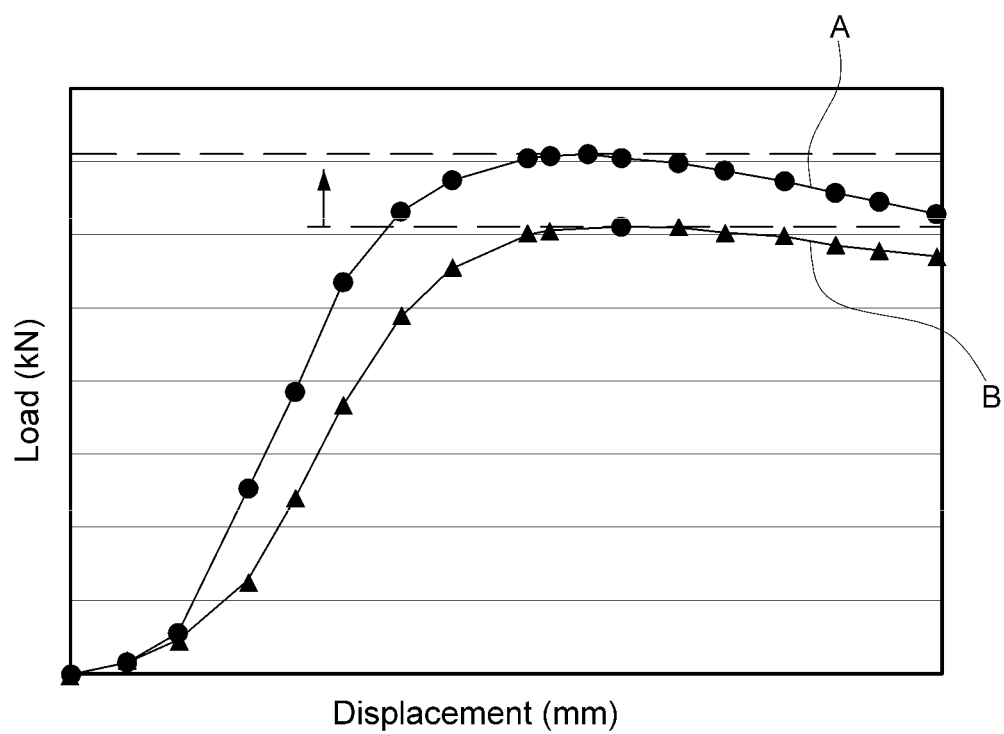

CABIN ASSEMBLY FOR CONSTRUCTION EQUIPMENT

CROSS-REFERENCE TO RELATED APPLICATIONS

The present application is a National Stage of International Application No. PCT/KR2018/002472, filed Feb. 28, 2018 which claims priority to Korean Application No. 10-2017-0026727, filed Feb. 28, 2017, the disclosure of which is incorporated herein by reference.

TECHNICAL FIELD

The present disclosure relates to a cabin assembly for a construction equipment in which a driver is aboard.

DISCUSSION OF RELATED ART

Construction equipment such as excavators and loaders are designed to perform a variety of tasks on construction sites. In general, a construction equipment includes a traveling body which allows the construction equipment to travel, a work device which performs works, a cabin in which a driver is aboard, and a main frame which supports the work device and the cabin and is coupled to the traveling body. The cabin is provided on one side of the main frame, and an operating device for operating the work device is provided in the cabin.

Meanwhile, since the construction equipment generates a lot of vibration during operation, a vibration absorbing means such as a fluid mount is disposed between the main frame and the cabin. The vibration generated in the construction equipment is absorbed by the vibration absorbing means and the vibration transmitted to the cabin is attenuated. However, since the cabin is coupled to the main frame through the vibration absorbing means, there is a problem that the structural stability of the cabin is poor.

In particular, the construction equipment often lifts a heavy object or works on a slope, in which case there is a risk that the construction equipment may roll over to side. In such a case, a strong impact is applied to the cabin from an external structure or the ground, and the impact may cause the cabin to be crushed or bent, and the driver in the cabin may be injured. That is, it is important to fix the rigidity for the cabin against an external force applied laterally. In a conventional structure in which a cabin of a construction equipment is connected to a main frame through a vibration absorbing means, there is a problem that the rigidity against the external force is much lower.

SUMMARY

Embodiments of the present invention may be directed to a cabin structure improved in terms of rigidity against external impact.

Technical Solution to the Problem

According to an embodiment, a cabin assembly for a construction equipment includes: a main frame; a mount mounted on the main frame; a cabin fixed to the main frame by means of the mount while being spaced a predetermined distance apart therefrom; a retainer for connecting the cabin to the main frame and fixing the cabin to the main frame such that the cabin is not inclined at a first angle or greater with respect to the main frame; and a support installed on one of the main frame and a lower surface of the cabin, including an end portion facing the other of the main frame and the lower surface of the cabin while being spaced apart therefrom, and when the cabin is inclined at a second angle or greater with respect to the main frame, contacting the other of the main frame and the lower surface of the cabin so as to support the cabin.

In an embodiment, the second angle may be less than the first angle.

In an embodiment, the retainer may include: a rod fixed to the cabin; a retainer hole defined at the main frame, through which the rod passes; and a fixture spaced apart from the retainer hole, provided at a lower end portion of the rod, and having a diameter greater than a diameter of the retainer hole. A size of the first angle may be adjustable by adjusting a gap between the retainer hole and the fixture.

The cabin may include an upper frame, a lower frame, and a plurality of pillars connecting the upper frame and the lower frame, and at least a part of the end portion of the support may be disposed at the cabin outwardly with respect to a central axis of the lower frame or the pillar.

In an embodiment, the support may be formed in a block shape having a predetermined height and is coupled to the cabin or the main frame.

In an embodiment, the cabin or the main frame may have a coupling hole, the support may be coupled to the coupling hole so that a height of the support is adjustable, and the second angle may be adjusted by adjusting the height of the support.

In an embodiment, the retainer may be installed on one side of the cabin, and the support may be installed on another side of the cabin opposite to the one side of the cabin where the retainer is installed, with respect to a center of the cabin.

Effects of the Invention

According to an embodiment of the present invention, by providing a retainer for preventing a cabin from being inclined at a first angle or greater with respect to a main frame; and a support for contacting the main frame to support the cabin when the cabin is inclined at a second angle or greater, rigidity of the cabin is improved since a lateral load acting on a pillar is distributed to an axial load, that is, a vertical load, of the pillar and since the cabin is also supported by the support.

In addition, according to an embodiment of the present invention, the retainer includes a rod and a fixture, the configuration of the retainer may be simplified, and it is advantageous that an inclination of the cabin, which is restricted by the retainer, can be easily adjusted.

In addition, according to an embodiment of the present invention, by configuring a height of the support to be adjustable, a size of the second angle may be readily adjusted by adjusting the height of the support.

BRIEF DESCRIPTION OF THE DRAWINGS

FIG. 1 is a perspective view illustrating a cabin assembly for a construction equipment according to an embodiment of the present invention.

FIG. 2 is an exploded view illustrating the cabin assembly of FIG. 1.

FIG. 3 is a rear view illustrating the cabin assembly of FIG. 2.

FIG. 4 is a cross-sectional view taken along line A-A of FIG. 2.

FIG. 5 is a view enlarging a portion B of FIG. 4.

FIG. 6 is a view enlarging a portion C of FIG. 4.

FIG. 7 is a view illustrating a state in which a cabin is inclined with respect to a main frame in FIG. 4.

FIG. 8 is a perspective view illustrating a support of a cabin assembly for a construction equipment according to an embodiment of the present invention.

FIG. 9 is a view illustrating displacement according to a change in load acting on a cabin assembly for a construction equipment according to an embodiment of the present invention.

DETAILED DESCRIPTION

Hereinafter, desired embodiments of the present invention will be described in detail with reference to the accompanying drawings. First, in assigning reference numerals to components in each drawing, it should be noted that the same reference numerals are used to refer to the same components as much as possible even if they are illustrated in different drawings. In addition, in describing embodiments, when it is determined that the detailed description of related well-known configurations or functions may obscure the gist of the present embodiment, the detailed description thereof will be omitted.

FIG. 1 is a perspective view illustrating a cabin assembly for a construction equipment according to an embodiment of the present invention. FIG. 2 is an exploded view illustrating the cabin assembly of FIG. 1. FIG. 3 is a rear view illustrating the cabin assembly of FIG. 2. FIG. 4 is a cross-sectional view taken along line A-A of FIG. 2. FIG. 5 is a view enlarging a portion B of FIG. 4. FIG. 6 is a view enlarging a portion C of FIG. 4. FIG. 7 is a view illustrating a state in which a cabin is inclined with respect to a main frame in FIG. 4. FIG. 8 is a perspective view illustrating a support of a cabin assembly for a construction equipment according to an embodiment of the present invention. FIG. 9 is a view illustrating displacement according to a change in load acting on a cabin assembly for a construction equipment according to an embodiment of the present invention.

A cabin assembly according to an embodiment of the present invention is to be provided in a construction equipment. The construction equipment may include a traveling body (not illustrated), a main frame 10, and a work device (not illustrated).

The traveling body is for moving the construction equipment and may be implemented in a wheel type or a crawler type.

The cabin assembly for a construction equipment according to an embodiment of the present invention includes the main frame 10, a cabin 30, a retainer 50 and a support 80.

The main frame 10 may be coupled to an upper portion of the traveling body and may move together with the traveling body. For example, FIG. 2 illustrates only a part of an entire structure of the main structure 10 to which the cabin 30 is fixed.

The cabin 30 provides a room in which a driver is aboard, and the cabin 30 may be provided therein with a driver's seat and a work device operation unit for operating the work device. In addition, the cabin 30 may be provided therein with various instrument panels and displays indicating the operating state of the construction equipment.

The work device is for carrying out a specific task and is supported by the main frame 10. For example, in the case of a construction equipment such as an excavator or a loader, the work device may be rotatably supported by the main frame 10, and the work device of the construction equipment, such as a forklift, may be supported by the main frame 10 to be liftable. Besides, the work device may be supported in various ways by the main frame 10 according to the operating characteristics of the construction equipment.

The work device, supported by the main frame 10, may be coupled to any of left, right, front, and rear sides of the cabin 30, and may be coupled to the left and right sides at a time, as necessary. For example, in the case of a construction equipment such as an excavator, the work device may be coupled to the left or right side of the cabin 30, and in the case of a construction equipment such as a loader, the work device may be coupled to the left and right sides of the cabin 30. Hereinafter, an installation structure of the cabin of the excavator is described by way of example, in which the work device (not illustrated) is provided on the left side (see FIG. 1) of the cabin.

The cabin 30 may be formed in a substantially quadrangular parallelepiped shape to define a room in which the driver can be aboard. However, the shape of the cabin 30 is not limited thereto and may be variously modified as necessary.

The cabin 30 may include a lower frame 32, an upper frame 34, and a pillar 36. In addition, the pillar 36 may be provided in plural.

The lower frame 32 and the upper frame 34 may constitute a bottom and a ceiling of the cabin 30, respectively, and may each have a quadrangular planar shape. The plurality of pillars 36 for supporting the upper frame 34 with respect to the lower frame 32 are disposed between the upper frame 34 and the lower frame 32.

The pillar 36 may be disposed at a corner portion of the lower frame 32 and the upper frame 34 but may be disposed at a center portion of the upper frame 34 and the lower frame 32 to reinforce rigidity of the cabin 30. In addition, in order to fix the rigidity of the cabin 30, the cabin 30 may include a reinforcing frame 38, such as a strut, installed at various parts of the cabin 30.

The cabin 30 is fixed to the main frame 10, in which case, a mount 60 is provided between the cabin 30 and the main frame 10. The mount 60 is for attenuating transmission of vibration generated in the traveling body to the cabin 30. The mount 60 may be of a variety of types, such as a fluid mount and a rubber mount.

In the present embodiment, the mount 60 is depicted as being disposed at each of four corners of the cabin 30, but the number and mounting position of the mount 60 may be changed as necessary. A mount fixing part 12 may be formed at the main frame 10 to fix the mount 60. The mount fixing part 12 may be implemented in the form of a hole corresponding to the shape of the mount 60, and a part of the mount 60 may be inserted into the mount fixing part 12 to be fixed thereto.

Referring to FIGS. 4 and 5, a fixing bolt 62 is provided above the mount 60. When the cabin 30 is mounted on the mount 60, the fixing bolt 62 passes through the cabin 30, and in this state, a nut 64 is coupled to the fixing bolt 62 so that the cabin 30 may be fixed to the mount 60. Besides, the cabin 30 may be fixed to the main frame 10 by means of the mount 60 in various ways.

When the cabin 30 is fixed to the main frame 10 by means of the mount 60, a gap H1 is formed between a lower surface of the cabin 30, that is, a lower surface of the lower frame 32, and an upper surface of the main frame 10. Accordingly, the cabin 30 may tilt in left and right directions and front and rear directions in a state of being fixed to the main frame 10.

If the cabin 30 is inclined too much with respect to the main frame 10, the cabin 30 may be separated from the main frame 10.

The retainer 50 may be provided between the cabin 30 and the main frame 10 to prevent the cabin 30 from being inclined at a predetermined angle or greater with respect to the main frame 10.

The retainer 50 connects the cabin 30 and the main frame 10. In addition, the retainer 50 restricts the cabin 30 from being inclined at a predetermined angle (hereinafter, "a first angle") or greater with respect to the main frame 10. The retainer 50 allows the cabin 30 to tilt freely with respect to the main frame 10 in a range less than the first angle, while preventing the cabin 30 from being inclined with respect to the main frame 10 at the first angle or greater.

The retainer 50 may be installed on the left or right side with respect to a center of the cabin 30 in the left and right directions. In the present embodiment, there is an assembling problem due to the work device installed on the left side of the cabin 30, so it is depicted as an example that the retainer 50 is provided only on the right rear side.

The retainer 50 may include a rod 52 fixed to the lower frame 32 of the cabin 30 and extending downward; and a fixture 54 provided at a lower end portion of the rod 52. In addition, a retainer hole 14 may be defined at the main frame 10 to operate the retainer 50.

The rod 52 of the retainer 50 is fixed to the lower frame 32 of the cabin 30, and when the cabin 30 is coupled to the main frame 10, the rod 52 passes through the retainer hole 14. The retainer 50 is assembled as the fixture 54, having a diameter greater than a diameter of the retainer hole 14, is coupled to the lower end portion of the rod 52 in a state where the rod 52 of the retainer 50 passes through the retainer hole 14. That is, a diameter of the fixture 54 may be greater than a diameter of the retainer hole 14.

In such a state, when the cabin 30 is inclined in a range less than the first angle with respect to the main frame 10, the cabin 30 may freely tilt with respect to the main frame 10. When the inclination of the cabin 30 increases to reach the first angle, the cabin 30 is no longer inclined because the fixture 54 is caught by the retainer hole 14. A size of the first angle may be adjustable by adjusting a gap H2 between the retainer hole 14 and the fixture 54.

That is, as the gap H2 between the retainer hole 14 and the fixture 54 is wider, the first angle becomes greater, and conversely, as the gap H2 between the retainer hole 14 and the fixture 54 is narrower, the first angle becomes smaller.

Meanwhile, in the present embodiment, although the rod 52 of the retainer 50 is depicted as being coupled to the cabin 30 and passing through the main frame 10, it may be configured in the opposite way such that the rod 52 of the retainer 50 is coupled to the main frame 10 and passes through the lower frame 32 of the cabin 30, and the fixture 54 is caught by the cabin 30.

The rigidity verification of the cabin 30 may be carried out in several ways. One representative example is the rollover protective structure (ROPS) certification test. The ROPS certification test includes a test for verifying the rigidity of the cabin 30 by applying a load (F, see FIG. 1) to one side of the upper frame 34 of the cabin 30.

As described above, when a load in a lateral direction, that is, a lateral load, acts on the cabin 30, the cabin 30 is inclined in the left and right directions with respect to the main frame 10, relative to the cabin 30 of FIG. 1. When the inclination of the cabin 30 reaches the first angle, the retainer 50 is caught by the main frame 10, so that the cabin 30 is no longer inclined even if the lateral load is continuously applied to the cabin 30.

However, when the load, acting on the cabin 30 constrained by the retainer 50, continues to increase, the lateral load is applied, as a bending load, to pillars 36 that are installed on the opposite side of the load acting portion (the left side in FIG. 1) among the pillars 36. Accordingly, the pillar 36 may be deformed, and displacement may be generated when the pillar 36 is deformed, as illustrated in FIG. 9. In the conventional art, since the pillars 36 were permanently deformed before the load of the size proposed in the ROPS certification test was applied, the safety of the driver inside the cabin 30 was threatened. (See B in FIG. 9)

According to an exemplary embodiment, the support 80 may be provided to prevent deformation of the cabin 30 due to the lateral load. When the cabin 30 is inclined at a predetermined angle (hereinafter, "a second angle") or greater with respect to the main frame 10, the support 80 contacts the main frame 10 or the cabin 30 to support the cabin 30. That is, the support 80 may be installed on one of the main frame 10 and a lower surface of the cabin 30. In addition, the support 80 may include an end portion 81 of the support 80 that faces the other of the main frame 10 and the lower surface of the cabin 30, while being spaced apart therefrom.

The second angle is preferably smaller than the first angle formed by the retainer 50. This is to allow the cabin 30, inclined due to the lateral load, to be supported by the support 80 before being constrained by the retainer 50, as illustrated in FIG. 7. In a case where the cabin 30 is first supported by the support 80, when inclined due to the lateral load, the lateral load F acting on the cabin 30 is distributed into a load in an axial direction (vertical direction in FIG. 1) of the pillar 36, that is, the axial load, to act on the pillar 36.

That is, a significant amount of the bending load acting on the pillar 36 may be distributed into the axial load and supported by the support 80. Accordingly, the deformation of the cabin 30 due to the lateral load may be substantially prevented without increasing the bending rigidity of the cabin 30.

FIG. 9 is a graph illustrating such an effect, in which A represents a relationship between the lateral load of the cabin 30 and a displacement therefrom when the support 80 is provided, and B represents a state of a conventional cabin in which the support 80 is not provided. It is appreciated from FIG. 9 that when the support 80 is provided, the cabin 30 is capable of withstanding the lateral load greater than an allowable lateral load of the conventional cabin in which the support 80 is not provided, without changing the structures of the pillar 36 and the cabin 30.

In an embodiment, the support 80 may be provided at one of a lower surface of the cabin 30 and an upper surface of the main frame 10 to form a predetermined gap (H3) with the other thereof. The gap H3 means a gap between the end portion 81 of the support 80 and the lower frame 32 or the main frame 10 in a normal state, and may be defined by installing the support 80 so that the lower frame 32 or the main frame 10 may contact the end portion 81 of the support when the cabin 30 is inclined by as much as the second angle due to the lateral load.

That is, the second angle may be adjustable based on the gap H3. For example, the support 80 may be formed in a block shape having a predetermined height H4, as illustrated in FIG. 6, and may be installed by welding to a lower portion of the cabin 30.

In such a case, the cabin 30 and the support 80 may be molded integrally, which may facilitate mounting of the cabin 30 afterwards. When the support 80 is installed in this way, the gap H3 may be defined between the lower surface of the support 80 and the main frame 10.

Although not illustrated, the support 80 may be installed at an upper surface of the main frame 10. In this case, the gap H3 may be formed between an upper surface of the support 80 and a lower surface of the cabin 30. The above-described gap H3 corresponds to the height H4 of the support 80. If the height H4 of the support 80 increases, the gap H3 may be reduced.

In addition, in the cabin assembly for a construction equipment according to an embodiment of the present invention, the support 80 may be installed through a bolt coupling to a coupling hole (not illustrated) defined separately at a lower portion of the cabin 30 or the main frame 10. In addition, the second angle may be adjusted by adjusting the height of the support 80. That is, it is possible to smoothly cope with the change in the height of the support 80 that may be generated by a manufacturing error that may occur during the molding and assembly of the cabin 30.

As such, when the support 80 is installed through the bolt coupling, the support 80 may be formed in a substantially same or similar shape as the retainer 50, as illustrated in FIG. 8, or alternatively, the end portion defining the gap H3 may be formed into an extended bolt shape. When the support 80 is formed in a substantially same manner as the retainer 50, the effect of reducing manufacturing costs by sharing the parts can be expected.

In addition, in the cabin assembly for a construction equipment according to an embodiment of the present invention, the retainer 50 may be installed on one side of the cabin 30 and the support 80 may be installed on another side of the cabin 30. Specifically, the retainer 50 and the support 80 may be spaced apart from each other with respect to a center of the cabin 30. FIGS. 3 and 4 show an example in which the retainer 50 is installed at a lower right end portion of the cabin 30, and the support 80 is installed at a lower left end portion of the cabin 30.

In addition, the support 80 may be provided in at least one portion on the opposite side of a portion at which the retainer 50 is provided, with respect to the center of the cabin 30 in the left and right direction. FIGS. 1 and 6 show an example in which the support 80 is provided at a lower end portion of the pillar 36 on a left rear side of the cabin 30, as an example.

As described above, in the case of an excavator, the work device is installed near the left side of the cabin to generate space constraints. This makes it difficult to install additional components (for example, retainers, etc.) at the lower left end portion of the cabin 30. However, when the support 80 is provided as in the present embodiment, the rigidity of the cabin 30 may be easily enhanced even with such space constraints. If the support 80 may not be installed at the pillar 36, the support 80 may be installed at a predetermined position proximate to the mount 60 and the pillar 36.

In addition, in the cabin assembly for a construction equipment according to an embodiment of the present invention, the end portion 81 of the support 80 facing an object may be provided to have an outer circumferential surface to be disposed outwardly of a central axis X (see FIG. 6) of the pillar 36 or the lower frame 32.

To this end, when a cross-sectional area of the end portion 81 of the support 80 is greater than a cross-sectional area of the pillar 36 or when the cross-sectional area of the end portion 81 of the support 80 is less than the cross-sectional area of the pillar 36, the support 80 may be installed to be eccentric toward the outside with respect to the central axis X. In addition, an outer circumferential surface of the end portion 81 of the support 80 may be formed to have a size that does not protrude to the outside of the cabin 30 in consideration of components further installed at an outer surface of the cabin 30.

The foregoing description is merely illustrative of the present invention, and various modifications may be made by those skilled in the art without departing from the spirit of the present invention. Accordingly, the embodiments disclosed in the specification of the present invention are not intended to limit the present invention. The scope of the present invention should be construed according to the following claims, and all the techniques within the scope of equivalents should be construed as being included in the scope of the present invention.

The invention claimed is:

1. A cabin assembly for a construction equipment, the cabin assembly comprising:
   a main frame;
   a pair of mounts mounted on the main frame and spaced apart from each other in a width direction of the main frame;
   a cabin fixed to the main frame by means of the pair of mounts while being spaced a predetermined distance apart therefrom, wherein the cabin comprises an upper frame, a lower frame, and a plurality of pillars connecting the upper frame and the lower frame;
   a retainer for connecting the cabin to the main frame and fixing the cabin to the main frame, and disposed relatively adjacent to one of the pair of mounts; and
   a support disposed relatively adjacent to the other of the pair of mounts, installed on a lower surface of the cabin, disposed at the cabin outwardly with respect to a central axis of the pillar, including an end portion facing the main frame while being spaced apart therefrom, and when a lateral load is applied to the cabin in a lateral direction, contacting the main frame so as to support the cabin.

2. The cabin assembly of claim 1, wherein the retainer comprises:
   a rod fixed to the cabin;
   a retainer hole defined at the main frame, through which the rod passes; and
   a fixture spaced apart from the retainer hole, provided at a lower end portion of the rod, and having a diameter greater than a diameter of the retainer hole,
   wherein a degree of freedom of tilting in the direction in which the cabin is adjacent to the main frame is adjustable by adjusting a gap between the retainer hole and the fixture.

3. The cabin assembly of claim 1, wherein the support is formed in a block shape having a predetermined height and is coupled to the cabin or the main frame.

4. The cabin assembly of claim 1, wherein the cabin or the main frame has a coupling hole,
   the support is coupled to the coupling hole so that a height of the support is adjustable, and
   a degree of freedom of tilting in the direction in which the cabin is adjacent to the main frame is adjusted by adjusting the height of the support.

5. The cabin assembly of claim 1, wherein the retainer is installed on one side of the cabin, and the support is installed on another side of the cabin opposite to the one side of the cabin where the retainer is installed, with respect to a center of the cabin.

\* \* \* \* \*